US012775903B2

(12) United States Patent
Emery et al.

(10) Patent No.: US 12,775,903 B2
(45) Date of Patent: Oct. 27, 2026

(54) MAIL PIECE DELIVERY AND/OR COLLECTION SYSTEM AND METHOD

(71) Applicant: Escher Group (IRL) Limited, Dublin (IE)

(72) Inventors: Keith Emery, Dublin (IE); Alan Kilduff, Dublin (IE)

(73) Assignee: Escher Group (IRL) Limited, Dublin (IE)

( * ) Notice: Subject to any disclaimer, the term of this patent is extended or adjusted under 35 U.S.C. 154(b) by 0 days.

(21) Appl. No.: 18/833,157

(22) PCT Filed: Jan. 26, 2023

(86) PCT No.: PCT/EP2023/051881
§ 371 (c)(1),
(2) Date: Jul. 25, 2024

(87) PCT Pub. No.: WO2023/144245
PCT Pub. Date: Aug. 3, 2023

(65) Prior Publication Data
US 2025/0111327 A1 Apr. 3, 2025

(30) Foreign Application Priority Data
Jan. 27, 2022 (GB) ..................................... 2201056

(51) Int. Cl.
*G06Q 10/0833* (2023.01)
*G06Q 50/60* (2024.01)

(52) U.S. Cl.
CPC ......... *G06Q 10/0833* (2013.01); *G06Q 50/60* (2024.01)

(58) Field of Classification Search
CPC ...................................................... G06Q 50/60
See application file for complete search history.

(56) References Cited

U.S. PATENT DOCUMENTS 9,609,973 B1 4/2017 Pleasant
2015/0145643 A1* 5/2015 Fadell ..................... G07C 9/27 340/5.51

(Continued)

FOREIGN PATENT DOCUMENTS

WO WO 2018164674 9/2018

OTHER PUBLICATIONS

Z. Lou, "NFC Enabled Smart Postal System," 2010 Second International Workshop on Near Field Communication, Monaco, Monaco, 2010, pp. 33-38, doi: 10.1109/NFC.2010.9. (Year: 2010).*

(Continued)

*Primary Examiner* — George Chen
*Assistant Examiner* — Tayar M Kyu
(74) *Attorney, Agent, or Firm* — Cesari and McKenna, LLP; Omar M. Wadhwa

(57) ABSTRACT

A method of assisting and/or monitoring delivery and/or collection of a plurality of mail pieces is provided, each mail piece being delivered to or collected from a respective property or receptacle and each property or receptacle having a respective address or identifier, the method comprising: using a delivery and/or collection device, which includes or is connected to location-determining circuitry, to determine location during a delivery and/or collection round; using at least one database that stores boundary data defining geofence regions to obtain for each property or receptacle a boundary defining a respective geofence region; and the method further comprises: determining using the location-determining circuitry whether the delivery and/or collection device is within the geofence region for a property or receptacle for which a mail piece is to be delivered and/or collected; and issuing at least one communication and/or performing at least one action using the delivery and/or (Continued)

collection device in response to the presence of the delivery and/or collection device in the geofence region.

3 Claims, 4 Drawing Sheets

(56) References Cited

U.S. PATENT DOCUMENTS

| | | | |
|---|---|---|---|
| 2017/0322555 A1 | 11/2017 | Nikolic et al. | |
| 2018/0357848 A1* | 12/2018 | McLellan | G06F 21/44 |
| 2019/0325388 A1 | 10/2019 | McLellan et al. | |
| 2020/0219348 A1* | 7/2020 | Hanlon | G07C 9/00896 |
| 2021/0192443 A1* | 6/2021 | Hess | H04W 4/029 |

OTHER PUBLICATIONS

International Search Report and Written Opinion mailed Mar. 31, 2023 for International Application No. PCT/EP2023/051881 filed Jan. 26, 2023 for Escher Group (IRL) Limited, 15 pages.

* cited by examiner

MAIL PIECE DELIVERY AND/OR COLLECTION SYSTEM AND METHOD

The present application is the National Stage of International Application No. PCT/EP2023/051881, filed on Jan. 26, 2023, which claims the benefit of priority to the U.K. patent application no. 2201056.5 filed on Jan. 27, 2022, the contents of both of which are hereby incorporated by reference in entirety for all purposes.

FIELD

The present invention relates to mail piece delivery and collection systems and methods.

BACKGROUND

The Universal Postal Union (UPU) reported in 2018 that 75% of the world suffers from poor addressing or none at all, and the last mile of a parcel's journey has been found to most problematic.

The concept of geofences where GPS co-ordinates are checked to see if they correspond to a position within a defined area is well known.

The use of a near field communication (NFC) tag at an address or other delivery location to record a delivery to that address or location is also known.

It is desirable to provide improved efficiency, accuracy and/or monitoring of delivery or collection procedures, for example in relation to delivery or collection of mail pieces to multiple locations on a delivery or collection round. Even small improvements in efficiency or accuracy can have significant effects in reduction of time and resources, reduction in errors, and potentially reduction in damage or loss of mail pieces.

SUMMARY

In a first aspect of the invention, there is provided a method of assisting and/or monitoring delivery/collection of a plurality of mail pieces, each mail piece being delivered to or collected from a respective property or receptacle and each property or receptacle having a respective address or identifier, the method comprising:

- using a delivery/collection device, which includes or is connected to location-determining circuitry, to determine location during a delivery/collection round;
- using at least one database to obtain data and determine, using the data, for each property or receptacle a boundary defining a geofence region; and the method further comprises:

- determining using the location-determining circuitry whether the delivery/collection device is within the geofence region for a property or receptacle for which a mail piece is to be delivered/collected; and
- issuing at least one communication and/or performing at least one action using the delivery/collection device in response to the presence of the delivery/collection device in the geofence region.

The database may store boundary data defining geofence regions. The data may comprise boundary data. The data may comprise geolocation data. The database may map geolocation data to addresses and/or identifiers and may be used to obtain for each property or receptacle a boundary defining a geofence region.

The delivery/collection device may comprise a handheld delivery/collection device and/or wherein the delivery/collection device comprises GPS circuitry and/or wherein the delivery/collection device comprise an RFID reader or other NFC-device reader The property or receptacle comprises at least one of a residential or business property, a house, an apartment, an office, a site, a depot, a mail box or post box, a locker.

The at least one communication may comprise information concerning how mail pieces are to be delivered/collected for the property or receptacle, for example delivery instructions set by a recipient, sender or other user.

The information may comprise at least one of:

- information concerning a drop-off/pick-up location for a mail piece;
- information concerning which door of the property to use;
- an entry code;
- information concerning a hazard, for example presence of a dog or other animal, occurrence of building or other works;
- information concerning the recipient or sender, for example that they have a disability;
- information concerning events that are scheduled; and/or
- contact information of a recipient, sender or other user.

The delivery/collection instructions may be set by the recipient, sender or other user.

The communication may comprise an alert in response to determining that the location determined by the device in respect of delivery/collection of one of the mail pieces does not match the geofence region for the mail piece delivery/collection.

The location is determined by the device in response to input, for example by the user, indicating that said mail piece has been delivered or collected.

The at least one communication may comprise or form part of a delivery/collection protocol.

The delivery/collection protocol may include a workflow to be performed by the user.

The workflow for delivery/collection of a mail piece for a property or receptacle may include at least one of:

- taking a photograph of the mail piece and/or the property and/or the receptacle;
- placing the delivery/collection device in proximity to, or otherwise communicating with, the or a RFID device or other communication device;
- obtaining a signature or other confirmation from a recipient, sender or other user.

The method may comprise providing an alert by the delivery/collection device in response to at least one part of the workflow not being completed and/or correct.

At least some of the properties or receptacles may include a communication device, for example a radio-frequency identification (RFID) device or other near-field communication (NFC) device, and the method may comprise using the delivery/collection device to communicate with the communication device, for example thereby to confirm the presence of the delivery/collection device and/or the static communication device at the property or receptacle.

The delivery/collection instructions or other information may be stored by the communication device and the method may comprise obtaining the delivery/collection instructions or other information by communication between the delivery device and the communication device.

The communication with the communication device may be in accordance with, or form part of, the or a delivery/collection protocol.

The delivery/collection protocol may include checking that the determined location of the delivery/collection device and an expected and/or stored location for the static communication device match.

The method may comprise issuing an alert if the determined location of the delivery/collection device and the expected and/or stored location for the static communication device do not match.

For at least one of the properties or receptacles to which mail pieces are to be delivered/collected there may be one or more other properties or receptacles, for example one or more other flats, apartments, offices or mailboxes, within the geofence region for that property or receptacle.

The method may comprise at least one of:

displaying a list of properties or receptacles within the geofence region using the delivery/collection device;

indicating using the delivery/collection device mail pieces to be delivered/collected for the current geofence region.

The method may comprise determining whether a communication device, for example an RFID or other NFC device is expected to be present for the property or receptacle, and issuing an alert if communication with the communication device does not occur and/or storing or outputting a confirmation if communication with the communication device does occur.

The method may comprise issuing an alert and/or entering the delivery/collection device into a delivery/collection mode in response to the delivery/collection device passing through a geofence region and/or crossing a boundary.

The method may comprise preventing issuance of the alert and/or preventing entry into the delivery/collection mode if the device is in a transit mode during which a user or delivery/collection vehicle is travelling between, to or from properties or receptacles.

The method may comprise monitoring speed of movement of the delivery/collection device and/or delivery/collection vehicle and placing or maintaining the device in the transit mode in response to the monitored speed of movement being indicative of driving, for example in response to the monitored speed of movement.

The method may comprise placing or maintaining the device in the transit mode in response to user input and/or automatically.

The method may comprise providing route information to the user via the delivery/collection device.

The method may comprise sending at least one message to a mail piece recipient/sender or other user in response to the user device having a location within the geofence region or within a further, associated geofence region.

The further geofence region may be defined by a further boundary that is more distant from the property or receptacle than the boundary.

The at least one message may comprise an alert and/or comprises delivery/collection information, for example requirement to sign and/or pay on delivery/collection of the at least one mail piece.

The method may further comprise sending data to and/or receiving data from a remote server by the delivery/collection device, wherein the remote server is configured to monitor delivery/collection of mail pieces and/or performance and/or to provide delivery/collection instructions and/or route information.

The method may further comprise monitoring progress of delivery/collection of the mail pieces and issuing an alert if times between successive deliveries/collections are longer than expected and/or if the delivery/collection device or vehicle diverges from an expected route.

The delivery/collection device may comprise or be configured to communicate with a drone or other delivery/collection vehicle.

The method may comprise comparing location of the drone or other delivery/collection vehicle at a time of delivery/collection of a mail piece to a corresponding geofence region, for example thereby to determine correct delivery/collection.

The geolocation data may comprise at least one of GPS co-ordinates, longitude and latitude data, what3words® data or other location reference data.

In a further aspect, which may be provided independently there is provided a system for assisting and/or monitoring delivery/collection of a plurality of mail pieces, each mail piece being delivered to or collected from a respective property or receptacle and each property or receptacle having a respective address or identifier, the system comprising:

a delivery/collection device, which includes or is connected to location-determining circuitry, to determine location during a delivery/collection round; and at least one database that stores data that can be used to obtain for each property or receptacle a boundary defining a geofence region.

The delivery/collection device may be configured to:

determine using the location-determining circuitry whether the delivery/collection device is within the geofence region for a property or receptacle for which a mail piece is to be delivered/collected; and issue at least one communication and/or perform at least one action using the delivery/collection device in response to the presence of the delivery/collection device in the geofence region. to obtain data and determine, using the data, for each property or receptacle a boundary defining a geofence region The database may store boundary data defining geofence regions. The data may comprise boundary data. The data may comprise geolocation data. The database may map geolocation data to addresses and/or identifiers and may be used to obtain for each property or receptacle a boundary defining a geofence region.

In a further aspect, which may be provided independently, there is provided a delivery/collection device, which includes or is connected to location-determining circuitry to determine location during a delivery/collection round, wherein the delivery/collection device is configured to communicate with at least one database that stores boundary data defining geofence regions;

the delivery/collection device is configured to obtain for each property or receptacle a boundary defining a geofence region; and the delivery/collection device is further configured to:

determine using the location-determining circuitry whether the delivery/collection device is within the geofence region for a property or receptacle for which a mail piece is to be delivered/collected; and issue at least one communication and/or perform at least one action using the delivery/collection device in response to the presence of the delivery/collection device in the geofence region.

In another aspect, there is provided a computer program product comprising computer-readable instructions that are exectable to perform a method as claimed or described herein.

Features in one aspect may be applied as features in any other aspect. For example any of method, system or device features may be applied as any other of method, system or device features.

BRIEF DESCRIPTION OF DRAWINGS

Various embodiments of the invention will now be described by way of example only, and with reference to the accompanying drawings, of which.

DETAILED DESCRIPTION

Figure 1:
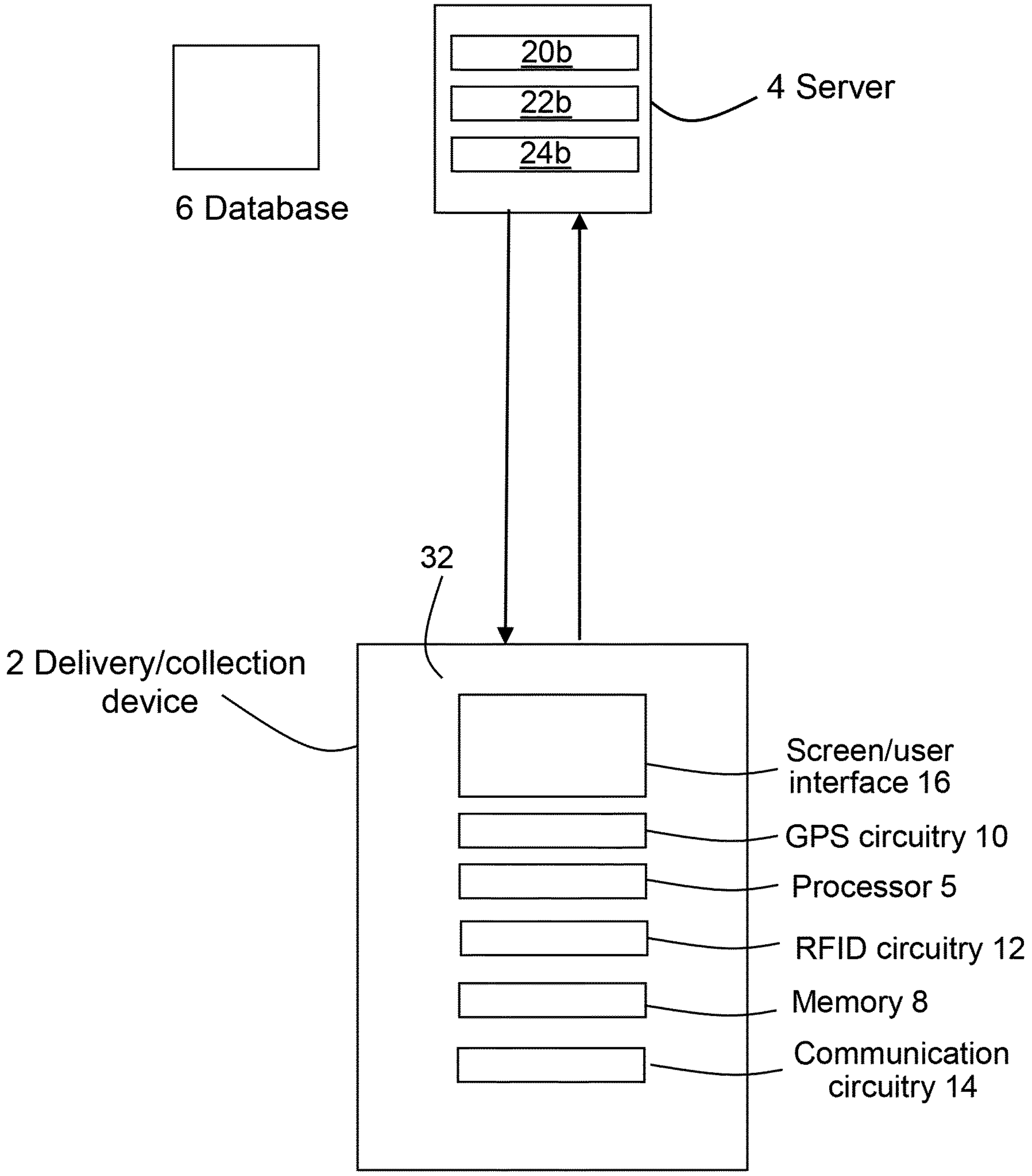
FIG. 1 is a schematic diagram of a mail piece delivery or collection system according to an embodiment.

FIG. 1 represents schematically a mail piece delivery or collection system according to an embodiment.

The system of FIG. 1 comprises a delivery/collection device 2, a remote server 4 and a database 6 which is in communication, or forms part of, the remote server 4.

The delivery/collection device 2 comprises a processor 5, a memory 8, GPS circuitry 10, radio-frequency identification device (RFID) circuitry 12, telecommunication circuitry 14, and a display screen 16.

In the present embodiment, the display screen 16 is a touchscreen that also functions as a user input device. In alternative embodiments, a separate user input device is included, for example a keyboard or touchpad.

The GPS circuitry 10 is operable to determine the location of the delivery/collection device 2 using GPS communication techniques. The RFID circuitry 12 is operable to communicate with RFID devices for example installed at a property or receptacle, and to read data from and/or write data to such RFID devices.

The telecommunication circuitry 14 is operable to communicate with remote devices, for example remote server 4, or the mobile telephone or other device of the or a user, using any suitable known telecommunication techniques for example any suitable 2G, 3G, 4G or 5G techniques.

The processor 5 is configured to control operation of the delivery/collection device 2, to receive data from and/or send data to the various components of the device, to receive user input via the display screen 16 or other user input device, and to provide output to a user via the display screen 16 and/or via audio and/or haptic devices that may also be included in the delivery/collection device 2 in variants of the embodiment. The processor 5 is also configured to send data to and/or receive data from the remote server 4.

The output to a user may comprise a series of interlinked screens or windows provided via the display screen 16 and forming part of a delivery/collection workflow. The workflow also includes monitoring location of the device 2 using the GPS circuitry 10, interacting with RFID devices using the RFID circuitry 12, and communicating with the remote server 4. The processor 5 in operation reads and executes a program stored in the memory 8 to provide the workflow.

The workflow provides interactive data display and entry to enable a user to manage and be guided or instructed with regard to a delivery/collection round, and provides monitoring of actions and movements of the user during the delivery/collection round. A delivery/collection round can begin and end at the same point or can begin and end at different points, and can be for delivery/collection to/from a single property or receptacle or to multiple properties/receptacles.

Any other suitable location determining circuitry or techniques can be used in alternative embodiments.

Figure 2:
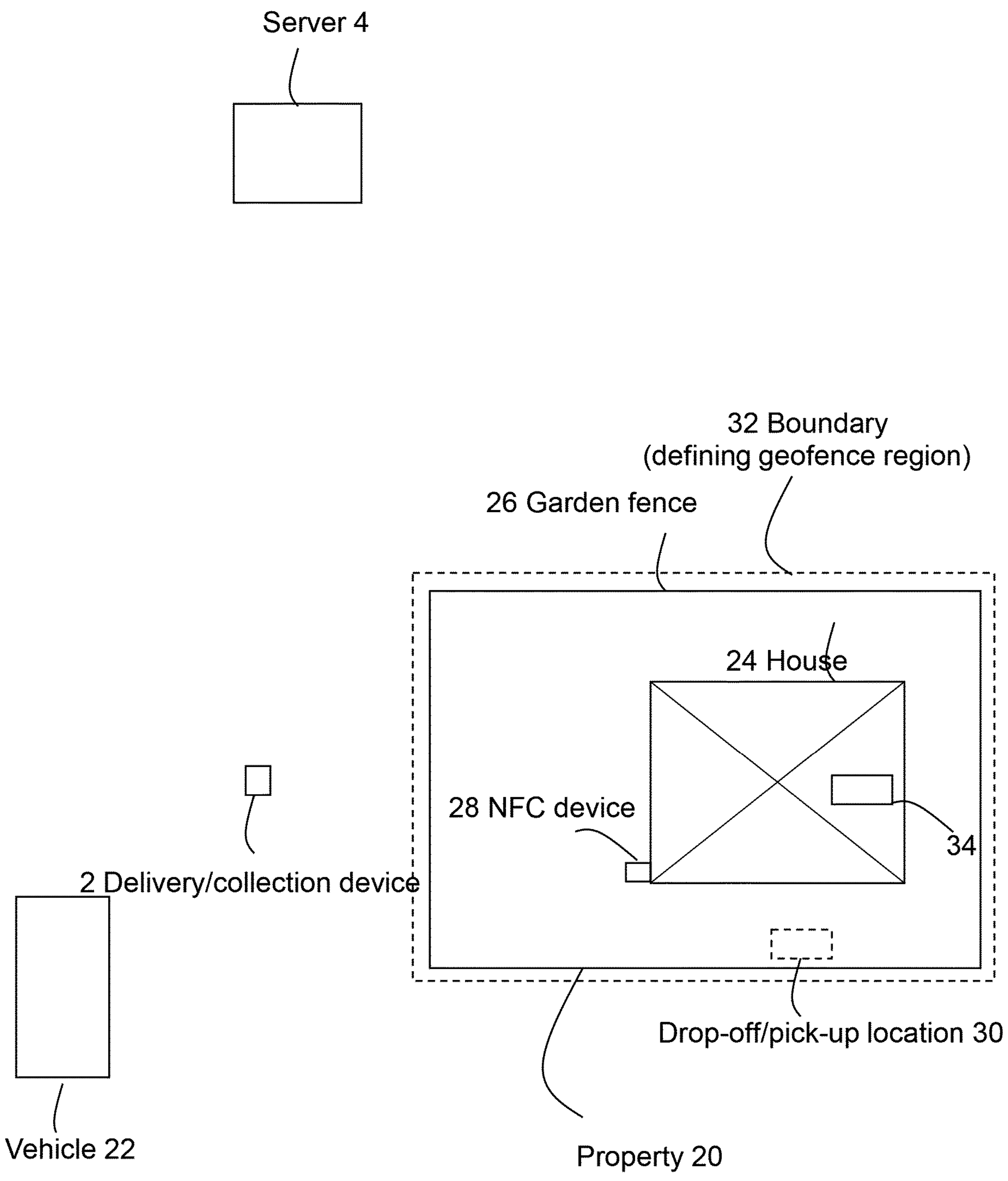
FIG. 2 is a schematic diagram illustrating collection of a mail piece from a property using the system of claim 1.

FIG. 2 is a schematic illustration of the delivery/collection device 2 of FIG. 1, which may be a handheld device, approaching a property 20 during a delivery round performed by a user (not shown). The user carries the delivery/collection device 2 during the delivery round, for example holding it in his or her hand, keeping it in pocket or bag and/or attaching it to themselves. In the present example, the user travels in a vehicle 22 and may attach the device 2 to a charging and/or communication point in the vehicle during travel between properties or receptacles.

The property 20 in this example is a residential property that includes a house 24 and surrounding garden delimited by a garden fence 26 that also represents the outer limits of the property 20. The property may be any other suitable type of property or other location to or from which a mail piece is to be delivered or collected. Mail pieces may also be delivered to or collected from any suitable receptacles for example mail boxes or parcel lockers, as well as or instead of properties.

The property 20 includes a near field communication (NFC) device 28 in the form of RFID device in this example. Any other form of static or other communication device may be provided in other embodiments.

A drop-off or pick-up location 30 is indicated by dashed lines on the figure. In this example, the drop-off/pick-up location is defined as being behind a bin storage area (not shown) at the side of the house 24. The drop-off/pick-up location 30 is the preferred location of the resident of the house, or other customer, for where mail pieces should be left (or from which mail pieces should be collected) if, for example, no-one is present at the property when delivery (or collection) occurs. The drop-off/pick-up location for the property 20 is stored in the database 6 and is accessible to the remote server 4 and the delivery/collection device 2. Any other suitable delivery or collection instructions may be provided in other embodiments.

The database may comprise a database of addresses or identifiers and, associated with each address or other location identifier, GPS data and/or other data defining a boundary of a geofence region for each corresponding property or receptacle.

A boundary 32 defining a geofence region using a set of co-ordinates is indicated in FIG. 2 by a dashed line.

The boundary 32 is set by the remote server 4 based on a physical location, for example a geolocation e.g. GPS co-ordinates, for the property 20. In this embodiment, a geolocation or other physical location for each property address or other delivery/pick-up location in a region, for example a town, city, county or country, is stored in database 6. The database stores co-ordinates that define the boundary of the property, in this example the boundary of the garden of the property.

The boundary of the property, represented by co-ordinates in the database 6 is used as a geofence for the property and the region inside the boundary 32 can be referred to as a geofence region. In FIG. 2, there is a slight mismatch between the garden fence 26 of the property and the geofence 32, as in this case the garden fence is not positioned precisely at the boundary but is offset by a few cm, as often may occur in practice. Although the property boundary and thus geofence 32 has a rectangular shape, the shape of property boundaries can vary widely, and thus the geofences for different properties are not restricted to having a particular shape but instead are the same as boundaries of the actual properties in this embodiment.

In other embodiments, or in situations where a property location is stored but co-ordinates defining an outer boundary of the property are not stored or otherwise available, or for example for mail lockers or other receptacles or property types in some embodiments, any other suitable method can be used to determine the shape and size of the boundary 32, and thus the geofence and geofence region. For example, if a property boundary is not stored or is other otherwise not accessible to the system, a circle, square, rectangle or other shape may be used by default as the boundary. For instance, a default radius or width and/or length or other dimension may be set, and the boundary may be set calculated on a point location of the property, and the default shape and dimension(s) of the boundary. For instance, in such embodiments the geofence may be set as a circle, rectangle, square or other shape centred on the stored location of the property. In other embodiments, the boundary 32 may be the same shape as the property but extended or reduced by a fixed distance in each direction, or based on the stored boundary of the property in any other desired manner.

Data representing the boundary 32 of the geofence region is stored in the database 6 and is available to the server 4 and the delivery/collection device 2, for instance via a real-time connection between the server 4 and the delivery/connection device 2. In alternative embodiments, or modes of operation, the delivery/collection device 2 obtains and/or stores the geolocation or other physical location of the property 20 and calculates the boundary, and thus the geofence region, itself. For example, the delivery/connection device 2 can download relevant data, such as property locations and boundaries, for a particular delivery and/or collection round from the server 4 in advance. The delivery/connection device 2 may in some embodiments synchronise data that it stores with data stored at the server 4, either at selected intervals or on command.

In operation, at the start of a delivery (or collection) round, the addresses or identifiers of the properties or receptacles where mail pieces are to be delivered (or collected) are provided to the delivery/collection device 2, together with the determined boundary 32 defining a geofence region for each property or receptacle.

During the delivery (or collection) round, the processor 5 monitors the current location of the delivery/collection device 2 as determined by the GPS circuitry 10. Actions that are performed based on the determined current location are now described in relation to delivery at one property 20 with reference to FIG. 2.

The user, in this case a postal delivery person, is informed of the next delivery address on the delivery round by a message displayed on the screen 16 of the device 2. The user drives to the address of the property 20 in vehicle 22, exits vehicle and walk towards the property.

The processor 2 continues to monitor the current location as determined by the GPS circuitry inside the boundary 32, and thus in the geofence region for the property 20.

In response to determining that the current location of the device 2 is inside the boundary 32, the device 2 issues at least one communication to the user, for example via display of text and/or image(s) using screen 16. In the present example, the screen 16 is used to provide the user with delivery instructions that indicate the preferred drop-off/pick-up location 30 for this property 20.

In the present example, the user in the form of the postal delivery person knocks on the door of the property. No-one is present in the property and in this case the mail piece to be delivered is a package that is too large to fit through a mail flap on the door of the property. Therefore, the user leaves the mail piece in the drop-off location 30 and then provides input via the device indicating that the mail piece has been delivered.

In response to the user input indicating that the mail piece has been delivered, the device 2 provides an instruction to the user to interact with the RFID device 28 at the property 20. The user then places the device 2 against, or in proximity to, the RFID device 28 and identifier data associated with the RFID device 28 is transmitted from the RFID device 28 to the delivery/collection device 2. A confirmation may be stored and/or outputted if communication with the communication device occurs correctly, and the confirmation may comprise the RFID identifier.

The device 2 stores the identifier data and/or sends it to remote server 4, as evidence that the user was present at the property 20 or receptacle.

The device 2 then provides an indication to the user via screen 16 of the next address on the delivery/collection round where a mail piece is to be delivered (or collected).

In alternative embodiments, the device 2 is configured to indicate to the user that one or more other actions should be taken as part of a delivery (or collection) workflow as well as or instead of interacting with the RFID device, for example taking a photograph of the mail piece and/or the property and/or receptacle, or obtaining a signature or other confirmation from a recipient or other person.

The processor 5 is able to perform verification processes with regard to delivery of the mail piece to the property 20. For example, the processor 5 can check that a stored location for the identifier obtained from the RFID device 28 matches the location of the device 2 determined by the GPS circuitry 10 at or near the delivery time. Alternatively or additionally, the processor 5 can check whether the location of the property 20 to which the specified mail piece is delivered matches the location determined by the device at or near the delivery time. The delivery time can, for example, be determined based on the input provided by the user when the user left the mail piece at the drop-off location 30.

If the processor 5 determines that there is a mismatch between the determined current location and the expected delivery or collection location for the mail piece and/or property 20, or determines that there is any other problem with regard to a delivery or collection location it can issue one or more alerts, for example audible, visual and/or haptic alerts to the user, via the device 2, and/or can send alert messages to the server 4 or other device. Alert messages may, for example, be sent to a mobile telephone or other device associated with the user or vehicle 22, as well as, or instead of, alerts being issued by the device 2.

Other verification or monitoring may be performed, for example by the delivery/collection device 2 and/or the server 4, based for instance on locations determined using the GPS circuitry 10 of the device 2 at different times. For instance, an alert may be issued, a performance flag may be raised, or monitoring data may be highlighted, sent or stored, if a device 2 seems to be present within a particular geofence region boundary 32 for an unexpectedly long or short period of time (e.g. if a dwell time is unexpectedly long or short) or if a user seems to be following an unexpected route, or diverging from an expected route, or delivering mail pieces in an unexpected or non-optimal order, or travelling too quickly or too slowly (for example, exceeding a speed threshold) during a delivery or collection, or a delivery or collection round.

Alerts and/or alert messages may be output if part of a workflow, for example a delivery or collection workflow, has not been completed or has not been performed correctly. For example, an alert could be issued if the device 2 has not interacted with the RFID device 28 or other static device, or if a photograph of the mail piece has not been taken, or a signature not obtained, despite such action(s) being instructed or required as part of the workflow. It may, for example, be determined that the action has not been completed if it has not occurred within a threshold time period following an earlier action or event, for example entry to the geofence region, or in response to change in location of the user device 2, for example in response to the device 2 having left the geofence region without the action being completed.

In the example described in relation to FIG. 2 the delivery instructions provided to the user indicated the preferred drop-off/pick-up location 30 for property 20. Any other desired information, for example concerning how mail pieces are to be delivered to, or collected from, the property may be provided to the user by the device 2. For example, any one or more of the following may be provided to the user: information concerning a location to leave a mail piece if a recipient is not present; information concerning which door of the property to use; an entry code; information concerning a hazard, for example presence of a dog or other animal, occurrence of building or other works; information concerning the recipient, for example that they have a disability; information concerning events that are scheduled; and/or contact information of a recipient or other user.

In the embodiment of FIG. 2, the device 2 may highlight the expected delivery/collection item(s) as well as pictorial representations of the services to be delivered, hazards etc. Once the device has entered an expected geofence region (e.g. velocity notwithstanding) it will alert the user if the geofence is left without the expected delivery/collection having been completed.

Instructions or other information concerning delivery/collection for individual properties or receptacles can be set, for example by individual recipients, residents, property owners, customers or other users. For instance, in the embodiment of FIG. 2, a resident may enter instructions or other information using a user interface via a home computer 34 or other device. The instructions or other information can be stored at the server 4 and sent to the delivery/collection device 2 if delivery/collection is due to take place for the property or receptacle in question. The instructions or other information may be sent to the delivery/collection device 2 in advance of a delivery/collection round, or may be sent in response to the delivery/collection device 2 being at or near the property or on request of the user.

In some embodiments, the instructions or other information concerning delivery/collection for an individual property or receptacle could be stored by the RFID device or other device at the property or receptacle, if the RFID device or other device has a memory and suitable processing capacity and/or communications capability. The data may then read by the delivery/collection device 2 when at or near the property or receptacle. For example, data could be transferred from a mobile telephone or other mobile device when in range of the RFID device or other device, or the RFID device or other device could be provided with Wi-Fi communication circuitry or other communication circuitry capable of communicating with a user's computer. However, in many embodiments the RFID device is a passive device with only short range RFID communication capability and thus the data would usually be obtained by the delivery/collection device 2 from the server 4 or other remote storage.

The communication with the user, for example via touchscreen 4, and the providing of instructions or other information, and receipt of user input, described above in relation to FIG. 2 in connection with delivery of a particular mail piece can form part of a workflow that is included in a delivery or collection protocol in accordance with which the delivery/collection device 2 operates.

The protocol may include or represent a set of rules and/or preferences for a delivery or collection round, including delivery to or collection from individual properties or receptacles, for example as discussed in relation to FIG. 2.

Figure 3:
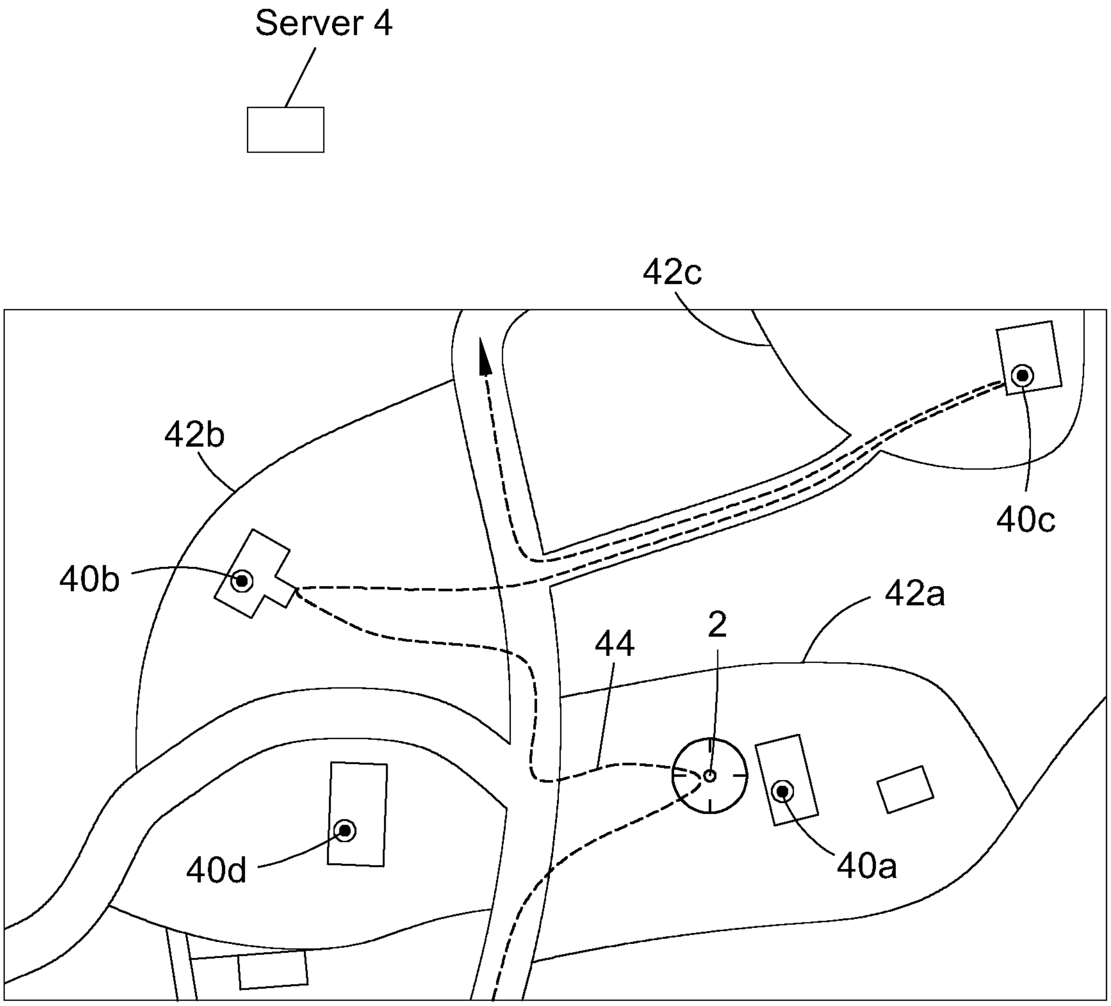
FIG. 3 is a schematic diagram illustrating use of the system of FIG. 1 in performing a delivery or collection round.
Figure 4:
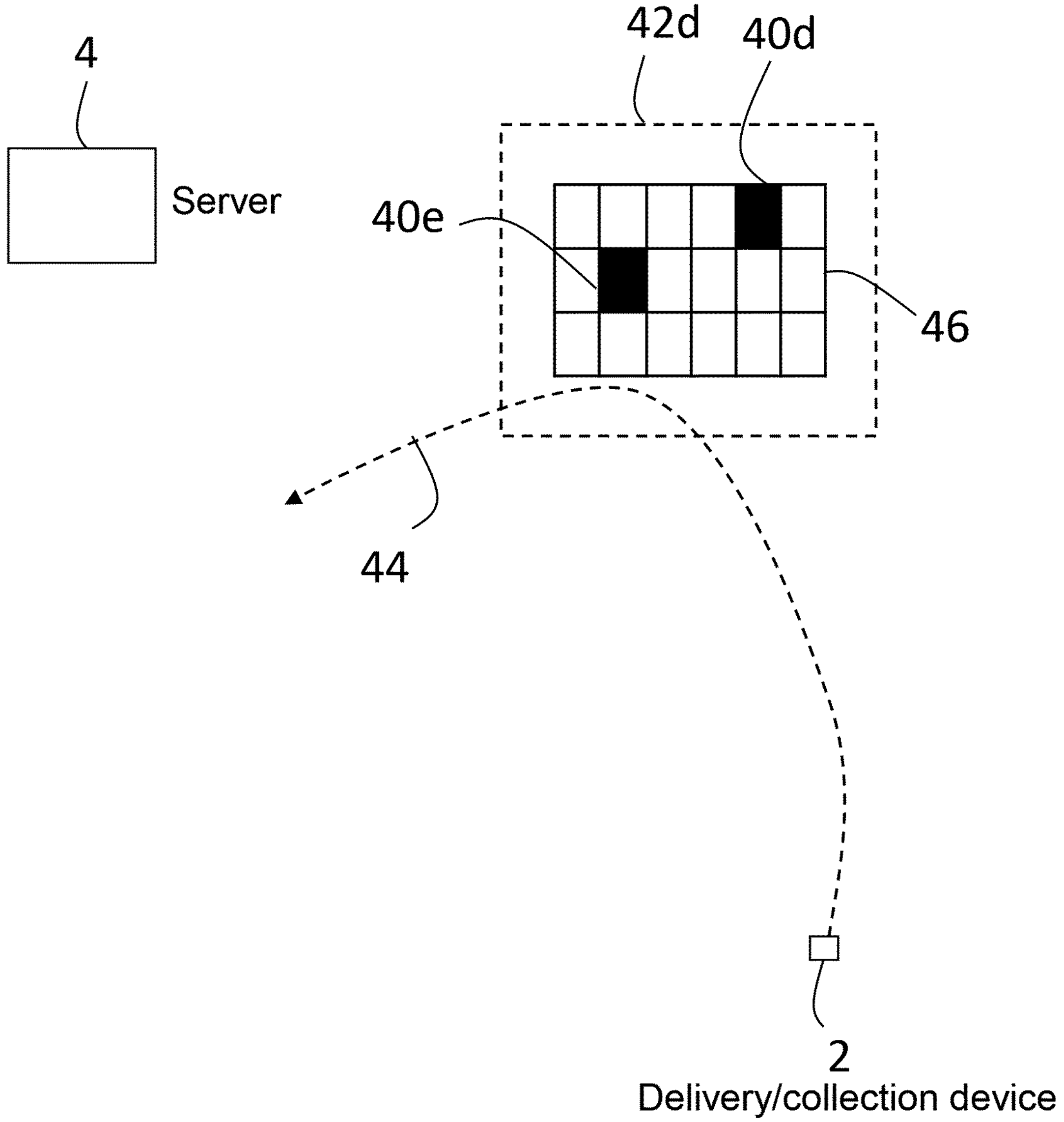
FIG. 4 is a schematic diagram use of the system of FIG. 1 in performing delivery or collection at an apartment block.

FIG. 3 illustrates schematically the performing of a delivery or collection round in accordance with an embodiment. Description is provided in relation to a performance of a delivery round but described features could also apply to a collection round. Furthermore, a delivery round may include at least some collections and, likewise, a collection round may include at least some deliveries, in some embodiments.

In the example illustrated schematically in FIG. 3, a user performs a delivery round that comprises delivering mail pieces to delivery locations 40*a*, 40*b* and 40*c* with the assistance of the delivery/collection device 2, where delivery locations 40*a*, 40*b*, 40*c* are houses each having a respective address Boundaries 42*a*, 42*b*, 42*c* are set for each of delivery locations 40*a*, 40*b*, 40*c* in a similar manner to that described in relation to FIG. 1, by determining GPS co-ordinates for each address, e.g. from GPS and address information stored in a database. The GPS co-ordinates comprise both a location 40*a*, 40*b*, 40*c* for each property and sets of GPS co-ordinates or other information that represent the boundary 42*a*, 42*b*, 42*c* of each property. The boundaries 42*a*, 42*b* and 42*c* are used by the delivery/collection device 2 as geofences that define geofence regions.

The boundaries 42*a*, 42*b*, 42*c* in this example correspond to the actual boundaries of the properties, for example the same or substantially the same as those recorded in a land registry or other property records.

Any other suitable source of property boundaries may be used. Alternatively or additionally geofences may be set, at least in part, based on user preferences (e.g. preference of the delivery person or delivery company, or preference of a resident, customer or other user), property type or other characteristic, and may be the same or different for different addresses or other delivery locations.

A route followed by the user is indicated generally by dashed line 44.

The delivery/collection device 2 may be configured to generate a suggested route based on the locations where mail pieces are to be delivered and/or collected, for example using any suitable mapping or route calculation technology. The device 2 may, alternatively or additionally, display a list of the addresses where mail pieces are to be delivered and/or collected. The list, route, delivery/collection locations and/or map may be displayed using the screen 16. In other embodiments or modes of operation, the user can select their own route and order of delivery and/or collection.

The delivery/collection device 2 can have various modes of operation between which it switches. In the example of FIG. 3, delivery/collection device 2 has a transit mode and a delivery/collection mode.

The processor 5 monitors speed of movement the device 2, for example based on measurements performed using the GPS circuitry 10 at a series of known times or time intervals.

The processor 5 places or maintains the device 2 in the transit mode in response to the monitored speed of movement being indicative of driving, for example in response to the monitored speed of movement, for example a rolling average of the speeds determined from the location measurements, being above a threshold.

The processor 5 also monitors the location of the device 2, determined by the GPS circuitry 10 relative to geofence boundaries 42*a*, 42*b*, 42*c* for properties to which mail pieces are to be delivered. The processor 5 may, for example, move the device 2 from being in the transit mode to be in a delivery/collection mode in response to the device 2 entering one of the geo-fence region defined by the boundaries 42*a*, 42*b*, 42*c*. Time spent by the delivery/collection device 2 within each geofence region may be referred to as dwell time, and dwell times are stored and/or monitored by the system in some modes of operation.

In various methods of operation, the processor 5 determines the current mode, or transitions between different modes, based on a combination of the determined speed and the determined location of the device 2, and/or one or more further parameters for example the current position in the workflow and/or recent user input or other actions and/or data from external sources, for example traffic data or data from sensors or systems of the vehicle 22. The various data can be used to determine whether it is likely that the user is currently travelling between locations, for example using a car, van, bicycle or other vehicle, or whether the user has arrived at a location and is about to, or is in the process of, performing a collection or delivery.

As well as, or instead of, the methods described in the previous paragraph, an operating mode, for example the transit mode or the delivery/collection mode, and/or transitions between such operating modes may be determined based on user input via the device 2. For example, a user may provide input to select the transit mode upon entry to the vehicle 22 and may provide input to exit transit mode upon parking or exiting the vehicle.

The issuing of alerts or alert messages, or other workflow actions, may depend on the operating mode of the device, as well as actions of the user, determined location, and/or input to the device 2. For example, the processor 2 may be configured to control the device 2 to enter the device into a delivery mode 2 in response to the delivery device crossing a geofence. However, in this example the processor 2 may issue an alert and/or prevent entry into the delivery mode in response to the delivery device crossing a geofence if the device is in a transit mode and the current speed of movement is above a threshold, as this suggests that the user has omitted to stop to make a delivery or collection.

It is recognised that while traveling to a property, receptacle or other location, a device 2 (e.g. carried by the user) may cross one or more geofences. The device recognises that it is traveling using GPS velocity parameters (e.g. obtained from location and time measurements) and may thus ignore these events. It is also possible for the user to manually set their status as 'In Transit' (e.g. to enter or maintain transit mode) to stop false alerts in built up areas such as a high street where geofence regions of individual properties may overlap.

Options and/or instructions provided to the user by the device may depend on the operating mode, and may change when for example the device switches between transit mode and delivery mode. For example, in transit mode a delivery route and/or list of delivery locations may be displayed by the device 2, whereas in delivery/collection mode instructions or other information concerning a specific delivery/collection and/or a specific delivery/collection address may be provided.

The delivery/collection device 2 in some methods of operation may also be configured to communicate, either directly or indirectly, with a recipient/sender, customer or other user as well as with the mail piece delivery/collection person.

For example, in some embodiments the delivery/collection device 2 is configured to send automatically at least one message to a mail piece recipient/sender or other user in response to the user device having a location within a predetermined proximity to an address and/or geolocation boundary address where a collection or delivery is to be made. Thus, the user recipient/sender or other user can be given advance notice that the delivery/collection person is at or is approaching their property or other location with which they are associated.

In the example of FIG. 3, message(s) are sent automatically to the recipient in response to the device 2 crossing the further boundary 48 in respect of delivery to location 40*a*, but no messages are sent to the recipients of deliveries to locations 40*b*, 40*c* as those recipients had not selected in their respective settings or profiles the option of receiving automatic messages. In other methods of operation, automatic messages may be sent in response to entry into geofence regions defined by boundaries 42*a*, 42*b*, 42*c* as well as or instead of in response to crossing one or more further boundaries that may be set. For example, it is possible to set one or more boundaries that are more distant from one or more properties or groups of properties than the geofences for those properties, and take desired actions in response to crossing such boundaries. For example, a notification may be sent to an operator, user or any other party, or data may be stored, indicating that a delivery/collection device 2 has crossed a boundary defining a region or neighbourhood where all, or a subset, of delivery/collection properties are located, for instance providing a start time or end time for a delivery/collection round or part of a delivery/collection round. In some methods of operation, message(s) may be sent in response to device 2 exiting the geofence region(s) as well as or instead of entry to the geofence region(s), for example to let the recipient know that the delivery/collection person has departed.

The messages may be sent to devices identified in profiles for recipients/senders, customers or other users that are stored in, for example, the database 6 and that are accessible to the device 2.

The at least one message may comprise an alert and/or delivery or collection information, for example whether there is a requirement to sign and/or pay on delivery/collection of the at least one mail piece. Thus, a recipient/sender may be warned that they may be shortly be required to make a payment, provide their signature or perform other action. It can also give the opportunity for the recipient/sender or other user to send a response message, for example to the server 4 and/or device 2, for instance to cancel or rearrange the delivery/collection or to call the delivery person to speak to them to provide further information or confirmation.

In the embodiment of FIG. 3, the recipient receives an SMS or similar notification when the delivery/collection device passes through the further boundary or boundary and can thus be prepared for the delivery/collection. The notification can tell them if they will be required to sign for the delivery, pay cash-on-delivery or customs charges or similar costs. If the delivery is to a high security location (e.g. a bank) then an additional notification may be provided to the delivery/collection person.

Returning to the delivery round of FIG. 3, the delivery of mail pieces to the properties of 40*a*, 40*b* and 40*c* is performed following the same or similar procedures as those described in relation to FIG. 2. The device 2 may, for example, use a combination of an electronic manifest and local datastore of the device 2 to predict the next delivery/collection job and highlight it for the user, along with information such as estimated time to arrival, navigation options and a summary of the services to be delivered. In some embodiments, time slots for delivery/collection may be set, and available or expected time slots may be indicated to a user, or recipient, sender or customer.

After delivery to property 40*c* the delivery/collection round may be completed and the user may return to a depot or other location, and/or there may be a notification either to or from the user that the delivery/collection round is completed.

In a variant of the example of FIG. 3, the delivery/collection round extends to further delivery locations 40*d* and 40*e*. Delivery locations 40*d* and 40*e* are particular apartments, within an apartment block 46 having multiple apartments. Each apartment in the apartment block has a respective, different address.

In the present example, the GPS co-ordinates, or other physical location, used by the system is the same for all apartments in the apartment block 46, and the boundary 42*d* set as a geofence in respect of apartments 40*d* and 40*e* has a rectangular shape in the same or similar proportions to a footprint of the apartment block 46 in this example. Thus, in this example, there are other properties, in this case other apartments, within the same boundary 42*d*, and thus geofence region, as the apartments 40*d* and 40*e* to which the mail piece is to be delivered, and the same boundary 42*d* and geofence region is used for both apartments 40*d* and 40*e*.

With regard to the properties 40*d* and 40*e*, there are multiple potential properties to which mail pieces could be delivered in the apartment building 46. The delivery/collection device 2 is configured to operate such that deliveries/collections within the same apartment block or other common location are clustered together or otherwise processed together or using the same specific sub-process or workflow. For example, all relevant addresses within the same geofence region may for part of a single delivery/collection sequence or other process. In the present example, the workflow of the device 2 in respect of properties 40*d* and 40*e* is different to that for delivery/collection for properties 40*a*, 40*b*, 40*c*. In response to crossing the boundary 42, the device 2 displays a list of properties within the apartment building to which mail pieces are to be delivered, in this case apartments 40*d* and 40*e*. The mail delivery person then enters via the device 2, and/or interacts with a respective RFID device at each property 40*d* and 40*e*, when the mail piece(s) are delivered to or collected from each apartment 40*d*, 40*e*.

Any other suitable workflows, or interactions with a user, can be provided in alternative embodiments relating to geofence regions that include multiple properties (e.g. apartments in an apartment building or offices in an office building, or parcel lockers in a set of parcel lockers). For example, any desired system for issuing alerts or notifications, for instance in response to mail pieces not have being delivered/collected to or from all necessary properties within the geofence region. Instructions to the user via the device 2 may be provided in any suitable manner. For example, properties may be listed or otherwise presented in an order that provides the most efficient delivery route through the apartment block or other structure within the geofence region. In some embodiments, a drop list of available properties within a particular geofence region (e.g. in an apartment of office building) may be provided, and for example the list may be filtered to show the properties within the geofence region where mail pieces are to be collected/delivered.

According to embodiments, information can be exchanged between the device 2 and the server 4 before, during and/or after a delivery/collection round. The server 4 can be used to monitor performance, efficiency or problems during a single delivery/collection round and/or across multiple delivery/collection rounds. The server can also monitor performance, efficiency or problems in respect of particular delivery/collection people or other users, for example based on entered and stored user identifiers. For example, the server can be used to monitor dwell time, and for example determine that a particular user has taken too long with a particular geofence region, for instance based on previous performance or based on the size or other characteristics of the geofence region or associated property. In another example, the server may determine that a user has taken, or started taking, a non-optimal route between locations either repeatedly or in a single instance, and may issue advice or alert(s) accordingly. Any other desired performance, efficiency, problem-monitoring or alert processes may be performed in alternative embodiments, and such processes may be performed by the server 4, the device 2 or other processing apparatus, and/or may be performed in distributed fashion across the server 4, the device 2 or other processing apparatus.

Central report data can be gathered to identify any shipments which have not been delivered within their targeted geofences. Confirmation that where a package mail piece was collected/delivered was within the geofence region defined for the delivery/collection address may also be provided.

Different preferences can be set, for example properties of workflows, boundaries, geofence regions, alerts or other procedures, user interfaces and preferences with regard to delivery/collections protocols or workflows can be set. Such preferences can be set variously, for example, by a system operator, by a mail piece delivery/collection service operator (which may or may not be the same as the system operator), by a delivery/collection person or other user, or by individual recipients, residents, property owners, customers or other users.

Individual delivery locations (e.g. properties) and/or recipients, residents, property owners, customers or other users may have associated profiles, either individually or collectively, that represent preferences and other characteristics. There may be some collective profiles, or parts of individual profiles that are common, for a neighbourhood, or an apartment building or other multi-property building or location. Delivery/collection people can also have individual or collective profiles that represent, for example, workflow preferences or other operating characteristics.

Embodiments have been described in which a delivery/collection person uses a delivery/collection device 2, for example in the form of a handheld device, to assist with delivery/collection of mail pieces. The delivery/collection device 2 can have any desired additional functionality for recording delivery/collection, monitoring performance, or communicating with the server, user, recipients/senders or other parties. For instance the delivery/collection device 2 may include a barcode reader, QR code reader, or other reading or scanning device that can be used to identify mail pieces or determine other mail piece properties. Such information read from bar codes or other identifiers may be linked to address or other information, for example by the server 4 or device 2. In other embodiments, the delivery/collection device 2 is in the form of a drone or other automatically- or remotely-controlled transportation device that can transport the mail pieces itself. In such embodiments, a delivery/collection action (e.g. dropping or picking-up a mail piece, or an alert to a drone operator to drop or pick up a mail piece) may be performed by the device 2 in response to the location of the drone or other device relative to the property or receptacle for delivery/collection, for example in response to the drone being within the geofence region. In other, similar embodiments the delivery/collection device 2 is a terminal or other device of an operator of a drone or other remotely controlled delivery/collection apparatus. Thus alerts, instructions or other information can be sent to the (drone) operator in such embodiments rather than to a delivery/collection person present at the property. In such embodiments, the communication device at the property or receptacle may be in the form of a Bluetooth, Wi-fi, or other wireless radio frequency (RF) or optical communication device that can, for example, communicate with the drone or other mail piece transportation apparatus for instance when it is in or near the geofence region.

In some embodiments, mail pieces themselves may be provided with RFID tags, or Smart labels, or other devices that provide communication capability, for example that include at least one antenna. In some such embodiments there may be communication with between the delivery/collection device 2 and the RFID tags, Smart labels or other communication devices on the mail pieces. The RFID tags, Smart labels or other communication devices may include address information or identifiers that may cross-reference to stored address information, or other information. The delivery/collection device 2 may thus obtain delivery/location information from the mail pieces themselves. In some such embodiments, the RFID tags, Smart labels or other communication devices may be used to automatically track movement of the mail piece, either directly or via communication with the delivery/collection device 2 that includes GPS circuitry. Thus, the mail piece itself may track its own delivery or collection and store itself, or instruct storage in a remote device, of its movements, delivery/collection or other events.

The device 2 may also store and/or provide information or instructions to the user in relation to other locations as well as or instead of collection/delivery locations. For example the device may store and/or provide information or instructions to the user in relation to one or more depots (for example, where a delivery/collection round may start or finish), start or end points, or fuel or charging stations.

Embodiments and methods of operation have been described in relation to delivery of mail items to properties. Such embodiments or methods of operation may also be used for collection of mail pieces from properties or delivery and/or collection of mail pieces to or from receptacles. A property or receptacle may comprise, for example, at least one of a residential or business property, a house, an apartment, an office, a site, a depot, a mail box or post box, a locker, a property or receptacle of an online or other retailer and/or within or at a warehouse or depot.

Any suitable mail pieces may be collected and/or delivered, for example letters, packages or parcels. The system may be operated or used by a public or private delivery/collection service and/or by an online or other retailer.

Although embodiments have been described in which GPS circuitry is used to generate GPS co-ordinates to represent position of the delivery/collection device, any other suitable location-determining system, protocol or data may be used in alternative embodiments.

Any suitable addressing schemes may be used, for example a unique postcode per address may be used, or a shared postcode may be used, and locations may be stored in respect of each postcode. Geocoded postcodes may be provided. Alternatively or addition, What3Words (W3W)® may be used. For instance, a geofence region may be associated with an array or other combination of W3W cells and the system may determine that delivery/collection is within one of the cells. Reverse lookup from GPS may be used as an additional validation if W3Ws are in the address. A customer or other user may provide high precision location information for a particular geofence regions (e.g. a list of W3W cells). Any other addressing information or scheme may be used, for example Google Plus Codes®.

GPS accuracy may not be exact and some embodiments may allow +/−n metres or other tolerance, with regard to calculations and/or setting of geofence regions, where n can have any suitable value, for example 0.5, 1 or 2 in some embodiments.

The database 6 may store data in any suitable format and within any suitable fields. For example, in one embodiment the database includes the following data elements for a particular delivery/collection location:

- Property Identifier
- Property Name(s)
- UDPRN—Unique Property Identifier
- DPID—Delivery Point ID
- Latitude/Longitude
- Geofence boundary values (e.g. Lat/Long and/or GPS co-ordinates or any other sets of values that can define the boundary)
- Delivery/Collection Services
- Delivery/Collection Hazards
- Delivery/Collection Instructions
- Active Date/Time As mentioned, in some embodiments an NFC tag is present at the delivery location. In at least some such embodiments, using the inbuilt NFC reading capabilities of the mobile device 2, the user scans the tag. This records a definite event used for audit purposes. In addition, the NFC serial number may be used to reference the local database for updated information, instructions to link to external systems (such as a web site) or opening a phone application with a number to call/SMS. There may be cross-referencing of location with GPS reading and geofence region to confirm that NFC location is within the geofence boundary.

Where no NFC tag is present, a user may be prompted to confirm the appropriate delivery record (for use in multiple occupancy dwellings etc). The user may be presented with a list of matched records based on the GPS location.

By combining known delivery addresses with a defined Geofence boundary area associated with that address and then cross referencing this information with the current GPS position on the mobile device being used for collections and deliveries, certain validations, workflows, warning alerts and other behaviours can be automatically triggered.

Embodiments may reduce or eliminate the possibility that when on a delivery/collection route, a delivery/collection person may miss a delivery/collection, rather than omissions only being identified when the delivery/collection person returns to their depot.

There are responsibilities for any services operator in terms of the welfare, health and safety of their employees. Some delivery locations may have specific hazards such as dogs or other animals on the property and warnings and alerts can be automatically given. Similarly, construction, live events or other events or incidents that may, for example, slow delivery/collection times or alter routes may be notified.

Proof of delivery/collection may be provided that, for example, verifies that collection/delivery occurred within the boundaries of a particular property.

Under certain contractual conditions it may be a requirement for a delivery/collection person to take a photo of where a mail piece has been left (or from where it has been collected) as proof of delivery/collection. If the item has been marked as delivered/collected and a photo has not been taken and the device is leaving the geofence region for the delivery/collection address then the delivery/collection person can be presented with an alarm or a warning.

Embodiments can help to reduce, or at least provide notification of, theft or misplacement of NFC or other devices, based on validation of the location of the NFC or other device based on the determined location of the delivery/collection device 2 when it interacts with the NFC device and verification that it is within the expected geofence region.

Embodiments can provided an assessment of productivity or efficiency, for example based on measured time (e.g. dwell time) between entering and leaving a geofence region, and conforming that it is appropriate for doing the delivery/collection. Deliveries and/or collections that take abnormally long can be identified. For example, the delivery/collection person may be taking too long or a recipient may not answer to sign for delivery etc. Problem delivery/collection people or problem delivery addresses may be identified. There is also a situation where the post may require proof that collections have been made from post boxes or other collection locations (PUDO locations, home addresses for returns etc.). This can be achieved with an NFC tag on the post box which is scanned by the mobile device 2 when the collection is made. In some embodiment, the use of an NFC tag or other similar device may be omitted, and the process may be made at least partly automatic by defining a geofence region around the post box and when the mobile device 2 enters the geofence region collection will be deemed to have taken place.

Whilst particular functionalities have been described herein as being provided by servers, memories, circuitries and processors, in alternative embodiments functionality can be provided by a single processor, memory circuitry, server or other component, or functionality provided by a single processor, memory, circuitry, server or other component can be provided by two or more processors, memories, circuitries, servers or other components in combination. Reference to a single circuitry, memory, processor and/or server or other component encompasses multiple components providing the functionality of that circuitry, memory, processor and/or server or other component, whether or not such components are remote from one another, and reference to multiple circuitries and/or processing resources encompasses a single component providing the functionality of those circuitries and/or processing resources.

Various functionalities as described can, in particular embodiments, be provided as modules obtained by operation of software and/or in hardware.

A skilled person will appreciate that variations of the described embodiments are possible without departing from the invention. Accordingly, the above description of the specific embodiments is made by way of example only and not for the purposes of limitation. It will be clear to the skilled person that minor modifications may be made without significant changes to the operation of particular embodiments described.

The invention claimed is:

1. A method for performing at least one of assisting in delivery or collection of a plurality mail pieces, monitoring delivery of the plurality of mail pieces, or monitoring collection of the plurality of mail pieces, each mail piece being delivered to or collected from a respective property or receptacle having a respective address or identifier, the method comprising:

using a device, which includes or is connected to location-determining circuitry, to determine a location during at least one of a delivery round or a collection round;

using at least one database, which stores boundary data defining geofence regions, to obtain a respective boundary defining a respective geofence region for each property or receptacle;

determining, using the location-determining circuitry, whether the device is within a particular geofence region for a particular property or receptacle for which a particular mail piece is to be delivered or collected;

issuing at least one communication or performing at least one action using the device in response to the presence of the device in the particular geofence region;

comprising issuing an alert or entering the device into a delivery/collection mode in response to the device at least one of passing through a selected geofence region or crossing a selected boundary;

determine that the device is in a transit mode and preventing issuance of the alert or preventing entry into the delivery/collection mode when the device is in the transit mode during which a particular user or a delivery/collection vehicle is travelling between, to, or from selected properties or receptacles;

communicating, by the device, with a drone or other delivery/collection vehicle; and comparing a drone location of the drone or a different location of the other delivery/collection vehicle at a time of a selected delivery/collection of a selected mail piece to a corresponding geofence region.

2. A system for performing at least one of assisting in delivery or collection of a plurality of mail pieces, monitoring delivery of the plurality of mail pieces, or monitoring collection of the plurality of mail pieces, each mail piece being delivered to or collected from a respective property or receptacle having a respective address or identifier, the system comprising:

a device, which includes or is connected to location-determining circuitry, configured to determine a location during at least one of a delivery round or a collection round, wherein the device comprises a hand-held device and a near-field communication (NFC) device reader, and wherein the location-determining circuitry comprises Global Positioning System (GPS) circuitry; and at least one database that stores boundary data defining geofence regions, wherein the device is configured to obtain a respective boundary defining a respective geofence region for each property or receptacle; and the device further configured to:

determine, using the location-determining circuitry, whether the device is within a particular geofence region for a particular property or receptacle for which a particular mail piece is to be delivered or collected;

communicate with an NFC device of the particular property or receptacle in accordance with, or as a part of, a delivery/collection protocol, wherein the delivery/collection protocol includes checking whether there is a match between the location of the device and a stored location for the NFC device of the particular property or receptacle;

issue at least one communication or perform at least one action using the device in response to the presence of the device in the particular geofence region; and issue an alert if the location of the device and the stored location for the NFC device of the particular property or receptacle do not match.

3. A device, which includes or is connected to location-determining circuitry including Global Positioning System (GPS) circuitry to determine location during a delivery/collection round, wherein the device, comprising a handheld device and a near-field communication (NFC) device reader, is configured to:

communicate with at least one database that stores boundary data defining geofence regions;

obtain a respective boundary defining a respective geofence region for each property or receptacle;

determine, using the location-determining circuitry, whether the device is within a particular geofence region for a particular property or receptacle for which a particular mail piece is to be delivered or collected;

communicate with an NFC device of the particular property or receptacle in accordance with, or as part of, a delivery/collection protocol, wherein the delivery/collection protocol includes checking whether there is a match between the location of the device and a stored location for the NFC device of the particular property or receptacle; and issue at least one communication or perform at least one action using the device in response to the presence of the device in the particular geofence region; and issue an alert if the location of the device and the stored location for the NFC device of the particular property or receptacle do not match.

* * * * *